United States Patent [19]
Miles

[11] 3,760,509
[45] Sept. 25, 1973

[54] RESPONSE UNIT
[76] Inventor: John R. Miles, 111 Hampton Rd., Williamsport, Md. 21795
[22] Filed: Nov. 7, 1972
[21] Appl. No.: 304,507

[52] U.S. Cl. .................................................. 35/9 R
[51] Int. Cl. ............................................. G09b 3/08
[58] Field of Search .................... 35/9 R, 9 B, 9 C, 35/9 D

[56] References Cited
UNITED STATES PATENTS
3,283,417  11/1966  Lohmar.................................. 35/9 R
3,548,517  12/1970  Penraat et al......................... 35/9 R
3,643,347   2/1972  Ziering.................................. 35/30

Primary Examiner—Wm. H. Grieb
Attorney—John N. Randolph

[57]  ABSTRACT

A teaching aid which is especially useful for individualized learning, and which makes possible adequate practice of an exercise involving, for example, fact-type learning materials which may be utilized repeatedly by the student without supervision, to obtain proficiency prior to actual testing and scoring by the instructor or teacher. By using the response unit, a student knows immediately whether a response is correct or incorrect. Indicia bearing cards, different sets of which are used in the response unit, may be removed individually only as a correct response is made by the pupil, and means is provided to score the number of attempts required to correctly respond to the questions posed by a set of cards.

6 Claims, 5 Drawing Figures

RESPONSE UNIT

SUMMARY

It is a primary object of the present invention to provide a novel response unit which may be employed by students, working unsupervised, as a learning aid, and which also may be utilized for testing the knowledge required in connection with particular materials by the student during his or her practice sessions.

Another object of the invention is to provide a device which may be economically manufactured and marketed, and wherein the indicia bearing material utilized therewith may be readily created by the instructor and can be used repeatedly, thus minimizing the expense involved in purchasing and utilizing the unit.

Still a further object of the invention is to provide a device which may be produced with slight variations and with certain embodiments primarily adapted for practice use only and other embodiments for use in testing.

Various other objects and advantages of the invention will hereinafter become more fully apparent from the following description of the drawings, illustrating presently preferred embodiments thereof, and wherein:

DESCRIPTION OF THE PREFERRED EMBODIMENT

Figure 1:
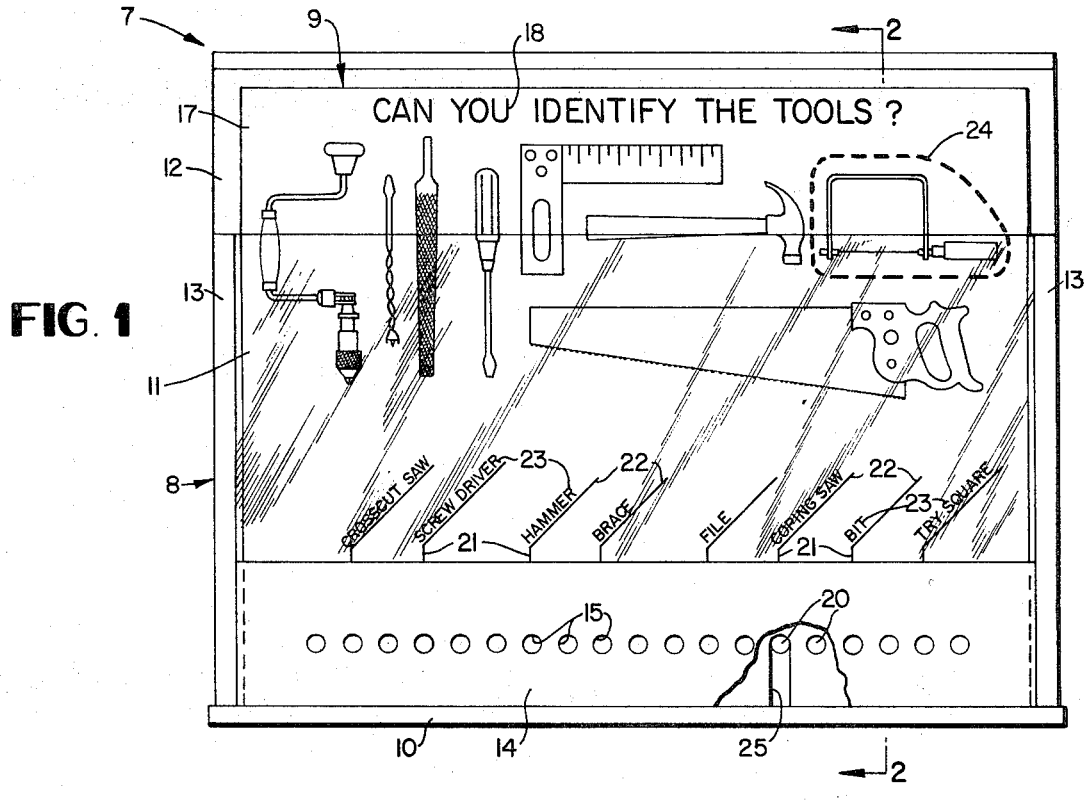
FIG. 1 is a front elevational view, partly broken away, of one embodiment of the response unit.
Figure 2:
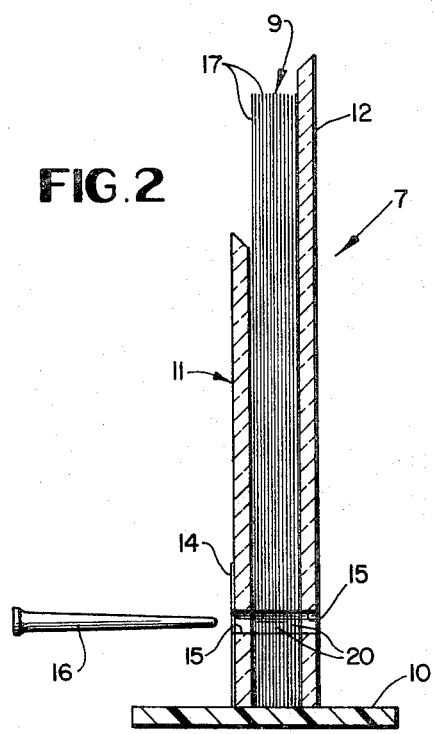
FIG. 2 is a transverse vertical sectional view, taken substantially along a plane as indicated by the line 2—2 of FIG. 1.

Referring more specifically to the drawings, and first with reference to FIGS. 1 and 2, the response unit as disclosed therein is designated generally 7 and includes a receptacle or holder designated generally 8 and a set of indicia bearing response cards, designated generally 9.

The receptacle 8 includes a flat base 10, upstanding spaced apart front and rear walls 11 and 12, respectively, and substantially parallel side walls 13 which are secured to and extend beyween side edges of the walls 11 and 12. The walls 11, 12 and 13 are fixed to and rise from the base 10, and said walls and the base are preferably formed of a substantially rigid transparent plastic material.

The front wall 11 includes an additional wall section 14 which is suitably secured along the outer side of the lower portion of the wall 11 and which is of an opaque material. The walls 11 and 12 and the wall section 14 are provided with aligned openings 15 arranged in a row extending lengthwise or horizontally, substantially from end to end of the walls, as illustrated in FIG. 1, and preferably constituting nineteen such openings. The unit 7 also includes a pin or stylus 16 which is sized in cross section to pass through any of the aligned openings of the walls 14, 11 and 12.

One of a number of sets of indicia bearing response cards has been illustrated, which set may include as many as eighteen individual cards 17 all of which cards of the same set bears the same indicia. As seen in FIG. 1, the front-most expose card 17 includes a title "Can You Identify The Tools?," designated 18, and illustrations or pictures of various tools 19. Each card 17 is provided with a longitudinal row of openings 20 adjacent to and spaced from its lower edge, so that when the cards are resting on the base 10, the openings 20 will be at the same elevation as the openings 15. Likewise, the cards 17 are of a length substantially corresponding to the spacing between the inner faces of the walls 13, so that the openings 20 will register with the openings 15, as illustrated in FIG. 2. Each card 17 has vertical lines 21 which align with all or certain of the openings 20 and 15 and which extend to above the opaque wall portion 14. Each line 21 may have a diagonal extension 22 along which is written or pirinted, as seen at 23, the word or words identifying one of the tools 19. Each card 17 contains illustrations of eight tools, so that each card contains eight lines 21 and 22 and eight identifying indicia 23. However, it will be obvious that a greater number of tools could be depicted, in which case more lines 21 and 22 and more legends 23 would be provided. Each card 17 has a different tool encircled, preferably in red, as indicated by the broken line 24 of FIG. 1. On the exposed card 17, the line 24 encircles the coping saw, and the opening 20, which is in alignment with the line 21 with which the legend "coping saw" is associated, is notched from said opening through the bottom edge of said card 17, as seen at 25 in FIG. 1. It will be apparent that a different tool will be encircled on each of the other cards and the notch 25 thereof will be in the opening 20 of the line 21 associated with the correct legend for the encircled tool.

Unit 7 of FIGS. 1 and 2 is a practice unit with which a student may test his knowledge of the tools illustrated by inserting the stylus or pin 16 through the openings 15 and 20 which he considers is associated with the legend 23 correctly identifying such tool. If his choice is a correct one, the front or exposed card will remain released so that it can be lifted out of the receptacle 8, since the pin 16 is in alignment with the notch 25. If an incorrect opening is selected, it will not be possible to lift the front or expose card from the receptacle 8. Thus, the student is immediately apprised as to whether or not he has answered correctly. Each card as it is correctly answered can be removed and stacked to one side of the receptacle 8 and the operation heretofore described repeated for each additional card as it becomes exposed in a front-most position of the stack 9.

Figure 3:
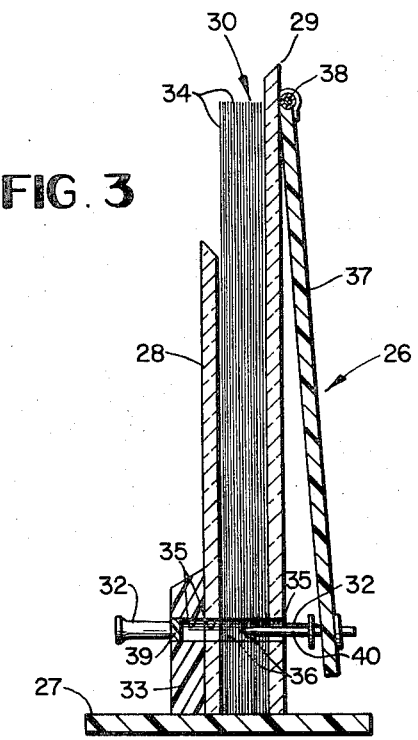
FIG. 3 is a transverse vertical sectional view of a second embodiment of the response unit.

FIG. 3 shows a second embodiment, designated generally 26, of the response unit, which includes a base 27, front wall 28, rear wall 29 and a stack of indicia bearing cards 30, corresponding to the base 10, front wall 11, rear wall 12 and stack 9, respectively. The receptacle 31 of the response unit 26 additionally includes side walls, not shown, corresponding to the walls 13, and a pin 32, corresponding to the pin 16. In lieu of the thin opaque wall portion 14 of the receptacle 8, the receptacle 31 is provided with a thicker opaque wall portion 33 which is disposed in front of the lower part of the transparent wall 28 and which functions for the same purpose as the wall 14, to conceal the location of the notch in the front-most indicia bearing card 34 of the stack 30. The walls 33, 28 and 29 have openings 35, corresponding to the openings 15, and each card 34 has an opening 36, corresponding to the openings 20.

In addition, one opening 36 of each card 34 has a notch, not shown, corresponding to the notch 25.

The receptacle of FIG. 3 additionally includes a plate 37 which is connected at its upper edge by a spring hinge 38 to the rear side of the rear wall 29, near the upper edge thereof. The plate 37 is of a length at least as great as the distance between the two end openings 35, so that said plate is disposed behind all of said openings. One opening 35 of the wall member 33 is closed by a plug 39. A pin 40 is connected to and carried by the plate 37 and extends into the opening 35 which is closed at its forward end by the plug 39. The spring 38 normally retains the plate 37 against the rear side of the wall 29, so that the pin 40 extends completely through the openings 36 of the cards 34 which align with the opening 35 closed by the plug 39, to prevent removal of any of the cards 34 from the receptacle 31 when the pin 40 is thus disposed, since none of the openings of the cards 34, which are engaged by the pin 40, is associated with a notch, corresponding with the notch 25.

The response unit or teaching aid 26 is utilized by the student in the same manner as heretofore described in connection with the unit 7; however, when the pin 32 is inserted from front to rear through a selected opning 35, the leading end of the pin moves through the walls 33, 28 and 29 and engages the plate 37 for swinging said plate outward and away from the wall 29, to move the pin 40, which constitutes the locking element for the cards 34, out of engagement with said cards, so that if the correct opening 35 has been selected, the front-most or exposed card can be removed, since the locking element has been removed from the set of cards and the pin 32 is in alignment with the notch of the front-most card. If an incorrect opening has been selected, the pin 32 will function as a locking element to prevent removal of the front-most card. Thus, with the unit of FIG. 3, unless the plate 37 is manually swung rearwardly, the front-most indicia bearing card 34 cannot be removed until the pin 32 has been inserted in the opening 35 representing a correct answer to the question posed by said card. The unit 26 can obviously be used for testing and a count can be kept of the number of tries required to correctly identify the tools or other items illustrated on all of the cards 34.

Figure 4:
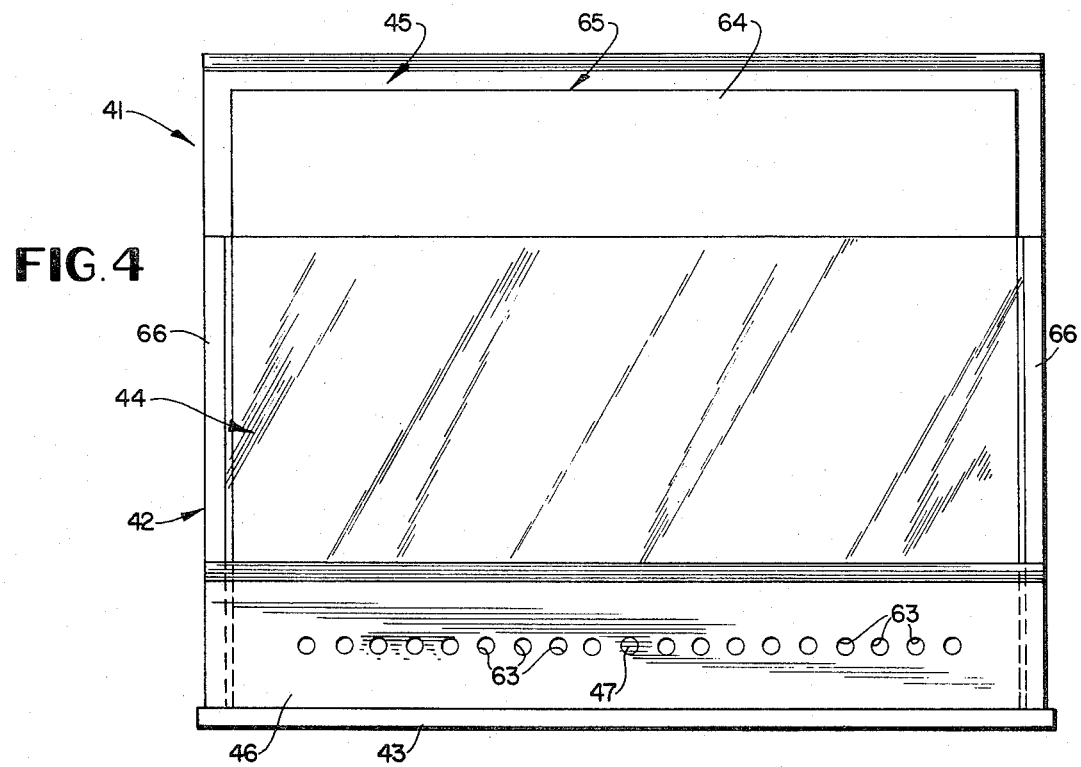
FIG. 4 is a front elevational view of a third embodiment of the response unit.
Figure 5:
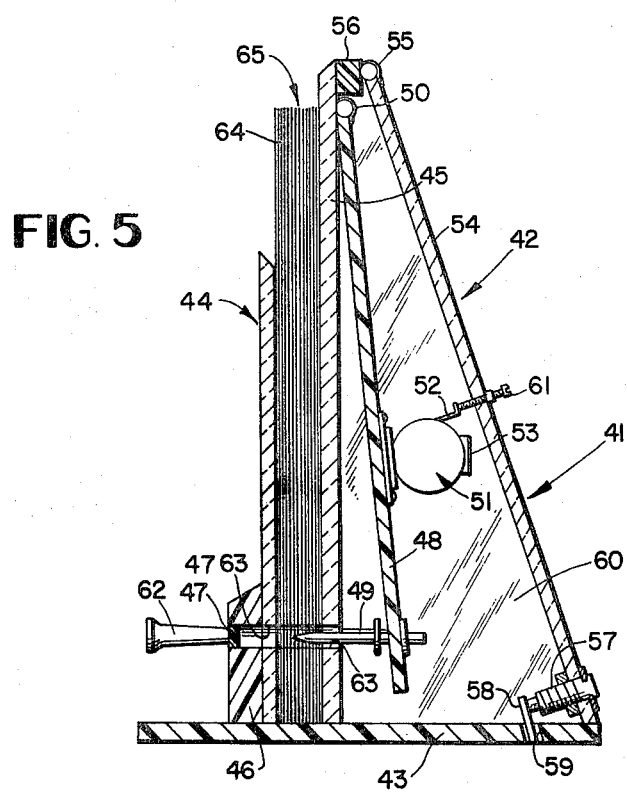
FIG. 5 is a transverse vertical sectional view of the response unit of FIG. 4.

FIGS. 4 and 5 illustrate a third embodiment of the response unit designated generally 41 and intended for use in testing. The unit 41 includes a receptacle 42 having a base 43 which is wider than the base 10 or 27. The receptacle 42 includes walls 44 and 45, corresponding to the walls 28 and 29, and a wall 46, corresponding to the wall 33. The receptacle 42 also has side walls 66 corresponding to the walls 13. Receptacle 42 has a plug 47, corresponding to the plug 39, a plate 48 and a pin 49, corresponding to the plate 37 and pin 40, respectively. The plate 48 is provided with a spirng hinge 50 to cause it to function in the same manner and for the same purpose as heretofore described in reference to the plate 37.

A conventional mechanical desk counter or tally 51 is secured to an supported by the rear side of the plate 48. The counter 51 is provided with a counter arm 52 and a window 53 through which the number, not shown, recorded on the counter 51 can be read. A second outer transparent plate or closure 54 is hinged at its upper edge at 55 to a cleat 56, located on the rear side of the wall 45, above the hinge 50. The lower portion of the closure 54 carries a lock 57 having a locking arm 58 which, when in a locked position, as seen in FIG. 5, engages in a slot 59 of the base 43 to prevent the closure 54 from being swung outwardly and upwardly to an open position. Receptacle 42 also includes side walls 60 with which the side edges of the closure 54 have close fitting engagement and between which the plate 48 is disposed for swinging movement. A screw 61 extends threadedly through the closure 54 and is adjustably mounted therein and disposed to be engaged by the counter arm 52 when the plate 48 swings away from the rear wall 45 a certain distance toward the closure 54, sufficient to move the pin 40 far enough away from the plug 47, so that if the pin or stylus 62, has been inserted into a correct opening 63 of the walls 46, 44 and 45, the front-most indicia bearing card 64 of the car stack 65 can be removed. Thus, the unit 41 is utilized by the student in the same manner as heretofore described in connection with the unit 26 of FIG. 3, except that insertion of the pin 62 in addition to causing the plate 48 to be swung rearwardly to move the locking pin 49 to a released position, additionally swings the counter 51 sufficiently toward the closure 54 to cause its arm 52 to strike the adjustable stop 61 and be actuated thereby to advance the number recorded on the counter by one digit.

Thus, the student utilizing the unit 41 can be tested, and the unit will accurately register the number of tries or attempts required to correctly identify the items on all of the indicia bearing cards. Only the teacher or instructor will have a key to release the lock 57 so that the closure 54 can be swung rearwardly and the counter 51 reset at zero.

Obviously, the sets of indicia bearing cards may include a variety of indicia such as questions relating to geography or history, or to weights and measures, and the lines on such cards, corresponding to the lines 21 of the cards 17, may be identified by numbers and these numbers may be associated with legends applied to the cards to identify other indicia thereon. For example, cards may contain maps of states divided into counties with each county bearing a number and with the names of the counties appearing elsewhere on the card. The nam of one such county will be encircled on each card and the student then selects the number on the map which he considers represents the encircled county. The response cards may also include sets of cards having multiple choice questions, and with the openings identified by the indicia "1a 1b, 1c" and "2a 2b 2c," etc. With such a set of cards, a sheet of paper may be placed behind the rearmost card so that each time the stylus or pin is inserted through the aligned openings it will punch a hole in the sheet, giving a profile of the student's attempts.

Various other modifications and changes are contemplated and may be resorted to, without departing from the funtion or scope of the invention.

I claim as my invention:

1. A response unit comprising a receptacle including spaced apart front and rear walls defining an upwardly opening pocket, a set of indicia bearing cards contained in said pocket including a font-most card disposed immediately adjacent said front wall and with the indicia thereof exposed to view, said walls, adjacent their bottom edges, having a series of horizontally spaced aligned openings, said cards having openings aligning with the openings of the walls, each card having a notch extending downwardly from one opening thereof through its bottom edge, said notches being disposed to align with indicia representing a correct answer for a question posed by the indicia of said card, said front wall having an opaque lower portion concealing the openings and notches of the cards, a stylus for insertion through aligned openings of the walls and cards whreby when the stylus is applied a front-most card can be removed if the stylus is in alignment with the notch of said card, a locking element extending through aligned openings of the walls and through an opening of each of said cards, and means engaged by the stylus when insertd through the walls for retracting the locking element out of engagement with the cards.

2. A response unit as in claim 1, a plate disposed behind said rear wall, a spring hinge connecting the plate at its upper edge to the rear wall and urging the plate to a position substantially flush against the rear wall, said locking element being carried by said plate, said plate swung away from the rear wall by movement of the stylus through the wall openings to permit removal of the front-most card only if the stylus is positioned in alignment with the notch of said card.

3. A response unit as in claim 2, a counter carried by said plate, and an abutment member disposed to engage an arm of the counter for causing the counter to be advanced one digit each time that the plte is swung away from the rear wall by insertion of the stylus through the pocket, for registering the number of tries required to successfully answer the questions submitted by the cards.

4. A response unit as in claim 3, and means for enclosing said counter for rendering the counter tamper-proof.

5. A response unit as in claim 4, said means including a transparent hinge closure through which the number recorded on the counter can be read, and means for locking said closure to prevent manual resetting of the counter.

6. A response unit as in claim 5, and said abutment being adjustably mounted in said closure.

* * * * *